No. 881,008. PATENTED MAR. 3, 1908.
S. P. KNUT.
TRUCK.
APPLICATION FILED SEPT. 4, 1907.
4 SHEETS—SHEET 1.
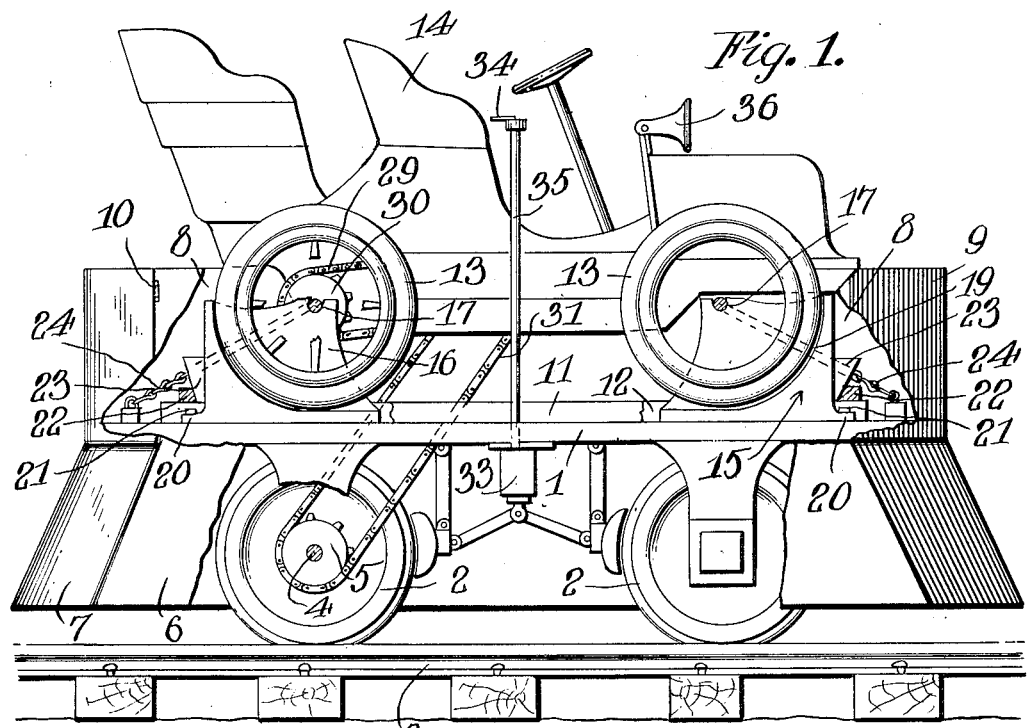
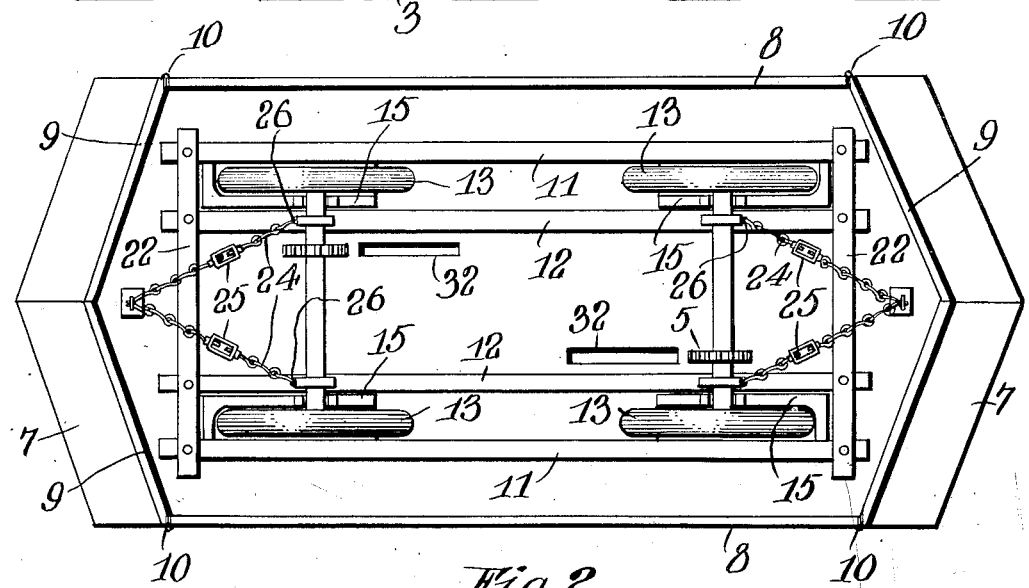
Witnesses
E. O. Hildebrand
M. Taylor
Inventor
Sargeant Prentiss Knut
by Georgii & Massie
Attorneys

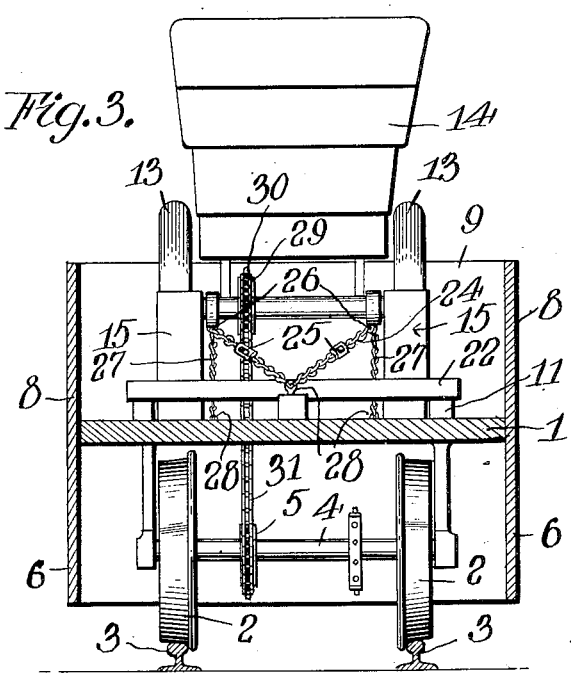

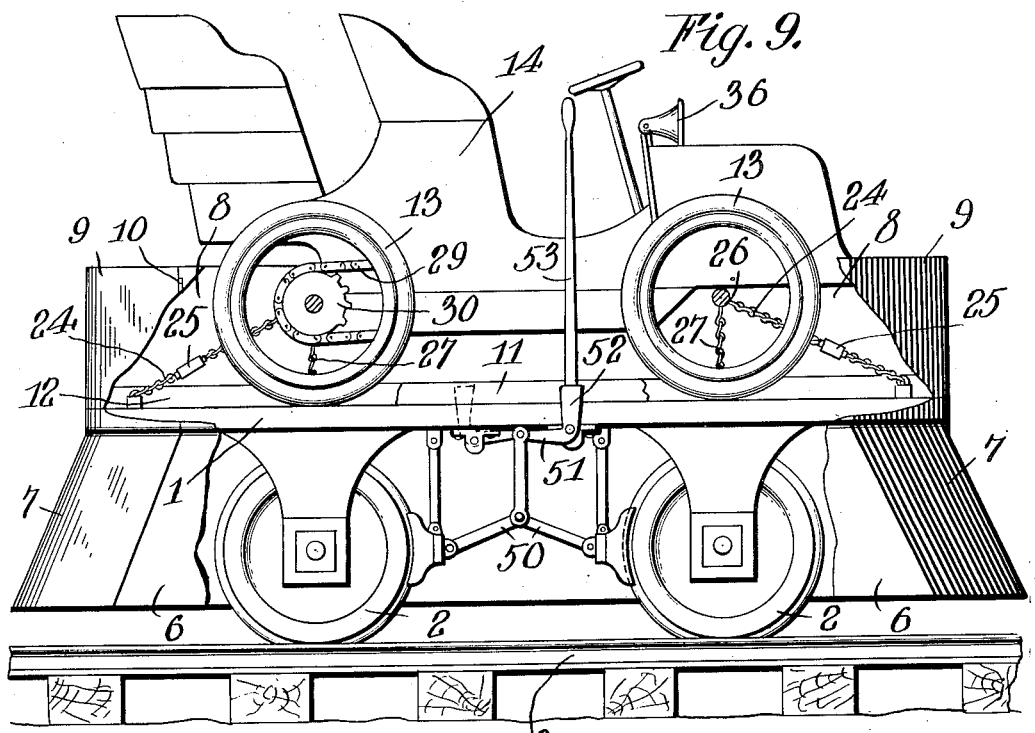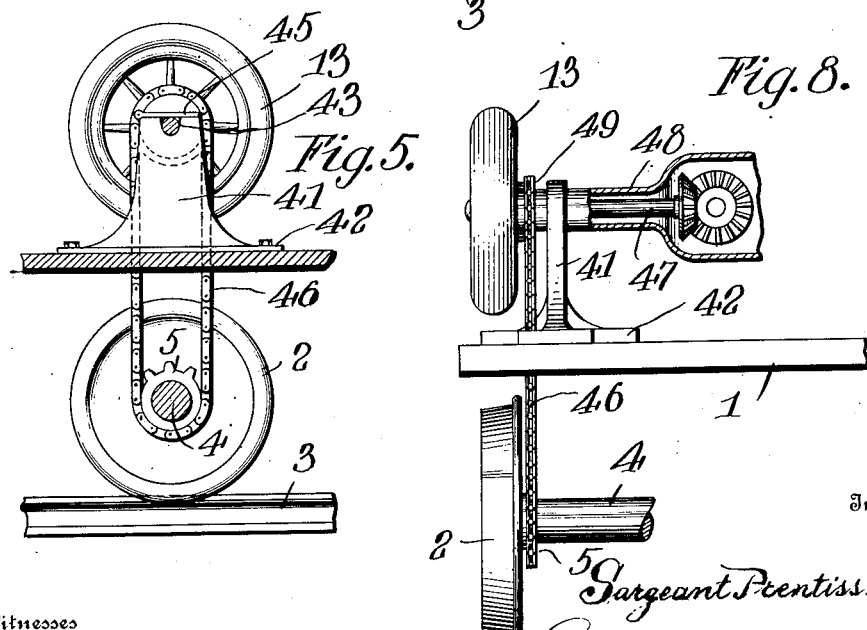

No. 881,008. PATENTED MAR. 3, 1908.
S. P. KNUT.
TRUCK.
APPLICATION FILED SEPT. 4, 1907.
4 SHEETS—SHEET 4.
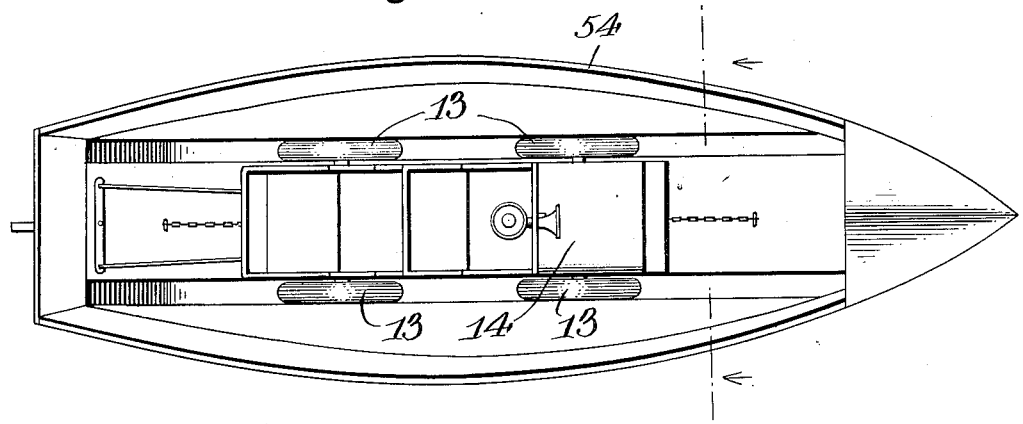
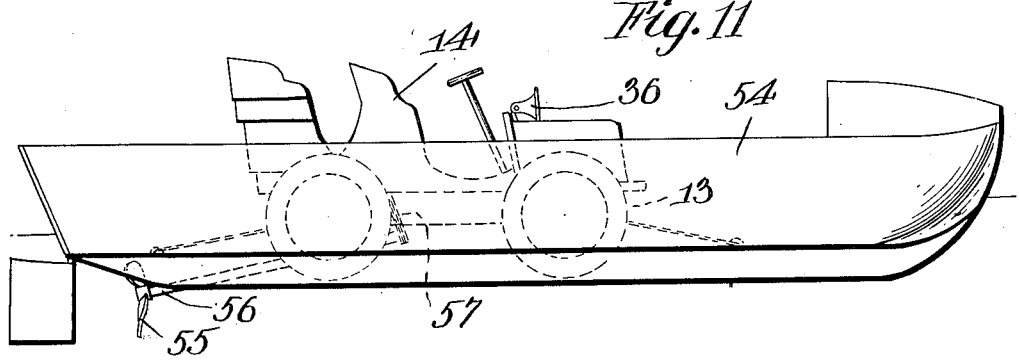
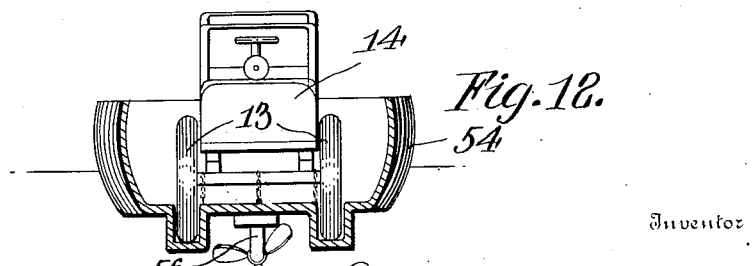

UNITED STATES PATENT OFFICE.

SARGEANT PRENTISS KNUT, OF WASHINGTON, DISTRICT OF COLUMBIA.

TRUCK.

No. 881,008.  Specifications of Letters Patent.  Patented March 3, 1908.

Application filed September 4, 1907. Serial No. 391,283.

*To all whom it may concern:*

Be it known that I, SARGEANT PRENTISS KNUT, citizen of the United States, residing at 1818 Corcoran street northwest, Washington, District of Columbia, have invented certain new and useful Improvements in Trucks; and I do hereby declare the following to be a full, clear, and exact description of the invention, such as will enable others skilled in the art to which it appertains to make and use the same.

My invention relates to vehicles and particularly to a vehicle arranged to travel on a railway track or water while carrying an automobile or other motor vehicle, the vehicle being driven by the motor of the vehicle.

The object of my invention is the provision of means whereby a railway track or navigable waters may be availed of by motorists for a certain portion of the trip without interfering in any way with the usefulness of the motor vehicle in its usual capacity at both ends of the railway or water trip.

Under modern conditions an increasingly large number of persons engaged in business in large cities live in the suburbs and often at a distance of many miles. Many persons use automobiles or motor cars as a means of transportation between their homes and the city, but such method of transportation is subject to the limitations of speed regulations and the inconvenience of the dust necessarily attendant upon any considerable speed on an ordinary road. As a solution of the problem, I propose the maintenance by the motorist living near a railroad, of a truck of appropriate size according to the automobile used, which truck shall be of light construction and easy running, provided with wheels suited to travel upon an ordinary railway track, having suitable screens to act as a wind brake, and a flat platform surface to receive the motor car, and provided also with means for securing the car firmly in place thereon, with means for alternatively gearing the car motor with the wheels of the car and the wheels of the truck.

The motorist leaving home in the morning would proceed to the nearest point on the railroad where his truck would be found resting on a siding. He would run his car under its own power by suitable skids on to the truck platform, secure it firmly in place, transfer the transmission gear from the wheels of his car to the wheels of the truck and then under his own power proceed to his destination, where he would run the truck on to another siding, again transfer the application of power from the truck wheels to the car wheels, run off the truck by skids to the ground and proceed to his place of business, leaving the truck on the siding until required on the return trip.

The general idea of the invention may be carried out by means of variable details, subject to modification within the field of the skilled mechanic as required by the circumstances of each case, but in the accompanying drawing I have shown a preferred embodiment of the invention with certain modifications, which invention is hereinafter more fully described and particularly pointed out in the accompanying claims.

In these drawings: Figure 1 is a side elevation, with portions broken away and partly in section, of a truck mounted on a track with the motor car in position; Fig. 2 is a top plan view below the car body; Fig. 3 is an end view with certain portions removed; Fig. 4 is a view, similar to Fig. 1, of a modification; Fig. 5 is a fragmentary view of a further modification; Figs. 6 and 7 are details of pillow blocks employed for supporting the car; and Fig. 8 is a fragmentary view of a modification; Fig. 9 is a view similar to Fig. 1 but of a further modification; and Figs. 10, 11 and 12 are a top plan, side elevation and transverse section of the invention embodied in a marine vehicle.

Referring to the drawings more in detail, the truck comprises a platform 1 mounted upon wheels 2, arranged to run upon the rails 3 of an ordinary railway track. The axle 4 of one of said wheels is provided with a toothed gear or sprocket wheel 5. On the two sides of the truck an apron 6 extends downwardly from the platform of the truck to a point near the ground serving as a screen, and at the two ends this apron slopes downwardly and beyond the truck platform at 7 so as to have a cutting or wedging action, and also to act as a "cow catcher". Preferably the platform itself is slightly pointed at the ends, and extending upwardly are side walls 8 with inclined ends 9 hinged at 10 to the four corners and meeting when closed at the center line of the truck, these gates 9 providing, when open, for the entry and exit of the motor car, and when closed acting as do the ends 7 to cut and break the wind at high speeds.

Upon the platform of the truck are arranged outer and inner guard rails 11 and 12, the outer rails resting snugly against the wheels 13 of the car 14 when it is in position, the space between the inner and outer guard rail of each set being slightly greater than the width of the wheel for a purpose to be hereafter more fully stated.

If we assume the car 14 to have been run upon the truck platform with its wheels just inside the guard rails 11, the front and rear of the car is lifted slightly by any suitable means, such as a crow-bar or the like, and the pillow blocks 15 slipped in place as shown in Fig. 1. One form of block is shown in detail in Fig. 6 and consists of two parts, one portion 16 constituting a support for the car and provided for that purpose with a notch 17 having its walls slightly inclined as shown. Another portion 18 of the block, preferably formed as a flange integrally with the pillow block portion, is curved so as to conform in its upper part 19 substantially to an arc of the car wheel to form a chock therefor. A flange 20 serves to receive a bolt 21 entering the platform of the truck and preventing longitudinal shifting of the block. As the car axle is allowed to drop into the notch 17 it tends to draw the tire of the wheel 13 firmly against the chock at 19 so as to hold the wheel and axle immovably in place. The same applies to each of the four wheels. The friction of the block base against the platform of the truck together with the bolt 21 prevent any longitudinal movement, while the breadth of the block base corresponds snugly to the distance between the inner and outer guard rails 11 and 12 and thus precludes lateral shifting. As a further precaution, cross bars 22 may be secured in place on the outer side of each chock and wedges 23 dropped into place between the two, so as to insure a close fit.

Furthermore guy chains 24 provided with turn-buckles 25 secured to the axles at 26, serve the purpose of preventing lateral or longitudinal shifting, while emergency chains 27 likewise secured at one end to the axles at 26 and at the other end to the guard rails or floor at 28 prevent any tilting or raising of the car at a sharp curve or by a severe jolt.

While we have shown these several devices one supplementing the other to prevent displacement of the car relative to the platform, all would not necessarily be used in conjunction and some might be omitted, as for instance, where the track was straight and level the chocks alone would be sufficient without the cross-bars, wedges, or chains.

Where the power is transmitted from the motor to the car wheels by means of a sprocket chain 29 and sprocket wheel 30, such chain would be disconnected or thrown out of operation in any well known and approved manner and another chain 31 brought into use gearing the car motor with the sprocket wheel 5 on the truck axle, such chain passing through a slot 32 in the truck and platform.

The gates 9 having been closed, the motorist would take his place in the car and operate the same in the usual manner, the motor driving the wheels 2 of the truck through the intermediary of the chain 31 and the gear wheel 5. At the end of the rail journey the operation will be reversed, the pillow blocks being removed, together with such of the other several safe-guards as had been employed, and the motor again geared to the wheels of the car instead of those of the truck.

It will be noticed from Fig. 2 that the platform of the truck is symmetrically arranged so that it will run equally as well in either direction, the motor car always facing the direction of travel. Thus on the return journey the motor car occupies a position facing the opposite end of the car, duplicate gear wheels 5 being provided on the truck axles and duplicate slots 32 in the platform for alternative use. The truck may be equipped with air brakes of any approved kind shown schematically at 33 operated by a lever 34 occupying a position at the side of the car within easy reach of the motorist and controlling the pipe 35. A pneumatic alarm whistle or horn 36 within easy reach may, like the brake cylinders, be supplied with compressed air in a manner now used on street railways and the like.

In Fig. 4 I have shown a modified power transmission in which a shaft 37, attached to the truck platform by hangers 38, carries a sprocket 39 and is permanently connected by a chain 40 with the sprocket 5 of the truck. In this case the chain 29 is used to drive both the sprockets 30 and 39 alternatively, the shaft 37 being so positioned on the truck that its sprocket 39 shall be the same distance from the motor shaft as the sprocket 30, making the chain 29 interchangeable.

In Fig. 9, I have shown a further modification wherein the car wheels are not elevated upon pillow blocks above the platform of the truck, but rest thereon, lateral shifting being prevented by locating the guard rails 11 and 12 closer together than in the other construction so that the wheels 13 fit snugly between said rails, while longitudinal movement is prevented by the adjustable guy chains 24, the emergency chains 27 also being employed.

Instead of using the form of pillow block shown in Fig. 6, a modified form might be used in which the chock portion is omitted and the base of the block extended laterally as shown in Fig. 7. In this figure I have also illustrated optional means for preventing tilting of the car to be used instead of the emergency chains 27. In this case the pillow block 41 is provided with a broad base 42 and with a notch 43 having vertical walls. This notch is of sufficient depth to receive the axle 44 of the car, and a clip 45 spanning the notch above the axle prevents its lifting. This form of pillow block could readily be substituted for that shown in Fig. 1 without material change as to the other means employed for preventing relative shifting of the car and truck.

In Fig. 5 I have shown a fragmentary view of a further form of power transmission in which, the power is not shifted from the car to the truck, but is transmitted through the car axle to the truck. In this case, the notch 43 of the pillow block serves as a bearing for the axle of the car, the wheels rotating freely clear of the platform and the chain 46 transmitting the movement directly to the truck sprocket 5. This construction has the advantage that the ordinary car sprocket chain is not at any time disconnected. Obviously, the notch 44 of the pillow block may be provided with such well known anti-friction bearings and dust guards as may be deemed desirable.

In Fig. 8 is shown a further modification in which the power being transmitted directly by means of bevel gear or the like to the shaft 47 within the tubular axle 48, such power is in turn transmitted to the truck wheels by the chain 46 engaging a sprocket 49 carried by the inner hub-face of the car wheel, the stationary tubular axle 48 resting with its extremity in the notch 43 of the pillow block. As a further or optional means of applying braking action to the car, a hand power brake may be used, as shown in Fig. 9, the brake shoes being pressed against the truck wheels by toggle 50 operated by a crank lever 51 having one extremity formed as a socket 52 adapted to receive a bar 53 extending within easy reach of the motorist in the car. Such bar, being readily removable, may be used as a crow-bar or lever in placing the car, and to meet emergencies. The invention may also be embodied, as shown in Figs. 10, 11 and 12, in a marine vehicle such as a boat 54 driven by means of a propeller 55 upon a shaft 56 driven by the chain 57 from the drive axle of the car. In this case, the car will be maintained upon the boat in operative relation to the shaft driven by its motor, in one of the ways described in reference to a railway truck.

Having thus fully described my invention, what I claim as new and desire to secure by Letters Patent of the United States, is:—

1. The combination, with a motor car having tires, of a vehicle arranged to receive said car and provided with propelling means, and means independent of the motor car tires to gear the motor to the propelling means.

2. The combination, with a motor car, of a vehicle arranged to receive said car and provided with propelling means, and means to gear the motor to the propelling means and to the car wheels alternatively.

3. The combination, with a motor car, of a vehicle arranged to receive said car and provided with propelling means, means to gear the motor to the propelling means and to the car wheels alternatively, and means to prevent relative movement of the car on the vehicle.

4. The combination, with a motor car, of a vehicle arranged to receive said car and provided with propelling means, means to gear the motor to the propelling means and to the car wheels alternatively, and chains secured to the vehicle and to the car to prevent relative longitudinal movement of the same.

5. The combination, with a railway track, and a motor car having tires, of a truck arranged to receive said motor car and provided with wheels to run on said track, and means independent of the motor car tires to gear the motor to the wheels of the truck.

6. The combination, with a railway track, and a motor car, of a truck arranged to receive said motor car and provided with wheels to run on said track, and means to gear the motor alternatively to the wheels of the car and truck.

7. The combination, with a railway track, and a motor car, of a truck arranged to receive said motor car and provided with wheels to run on said track, means to gear the motor to the wheels of the truck, and means to prevent relative movement of the car and truck.

8. The combination, with a railway track, and a motor car, of a truck arranged to receive said motor car and provided with wheels to run on said track, means to gear the motor alternatively to the wheels of the car and the truck, and means to prevent relative movement of the car and truck.

9. The combination, with a railway track, and a motor car, of a truck arranged to receive said motor car and provided with wheels to run on said track, means to gear the motor to the wheels of the truck, and means independent of its wheels to sustain the weight of the car on the truck.

10. The combination, with a railway track, and a motor car, of a truck arranged to receive said motor car and provided with wheels to run on said track, means to gear the motor alternatively to the wheels of the car and truck, and means independent of its wheels to sustain the weight of the car on the truck.

11. The combination, with a railway track, and a motor car, of a truck arranged to receive said motor car and provided with wheels to run on said track, means to gear the motor alternatively to the wheels of the car and truck, and means to prevent longitudinal movement of the car on the truck.

12. The combination, with a railway track, and a motor car, of a truck arranged to receive said motor car and provided with wheels to run on said track, means to gear the motor alternatively to the wheels of the car and truck, and means to prevent lateral movement of the car on the truck.

13. The combination, with a railway track, and a motor car, of a truck arranged to receive said motor car and provided with wheels to run on said track, means to gear the motor alternatively to the wheels of the car and truck, and guard rails secured to the truck platform and bearing laterally against the car wheels to prevent lateral movement of the car on the truck.

14. The combination, with a railway track, and a motor car, of a truck arranged to receive said motor car and provided with wheels to run on said track, means to gear the motor alternatively to the wheels of the car and truck, and chocks arranged in line with and bearing against the car wheels to prevent longitudinal movement of the car on the truck.

15. The combination, with a railway track, and a motor car, of a truck arranged to receive said motor car and provided with wheels to run on said track, means to gear the motor to the wheels of the truck, and pillow blocks arranged beneath the car axle to sustain its weight independent of the wheels.

16. The combination, with a railway track, and a motor car, of a truck arranged to receive said motor car and provided with wheels to run on said track, means to gear the motor alternatively to the wheels of the car and truck, and pillow blocks arranged beneath the car axle to sustain its weight independent of the wheels.

17. The combination, with a railway track, and a motor car, of a truck arranged to receive said motor car and provided with wheels to run on said track, means to gear the motor alternatively to the wheels of the car and truck, and chains secured to the truck and to the car to prevent relative shifting of the two.

18. The combination, with a railway track, and a motor car, of a truck arranged to receive said motor car and provided with wheels to run on said track, means to gear the motor to the wheels of the truck, chains secured to the truck and to the car to prevent relative movement of the same, and turn-buckles in said chains providing for their adjustment.

19. The combination, with a railway track, and a motor car, of a truck arranged to receive said motor car and provided with wheels to run on said track, means to gear the motor alternatively to the wheels of the car and truck, chains secured to the truck and to the car to prevent relative movement of the same, and turn-buckles in said chains providing for their adjustment.

20. The combination, with a railway track, and a motor car, of a truck arranged to receive said motor car and provided with wheels to run on said track, means to gear the motor alternatively to the wheels of the car and truck, pillow blocks provided with slots to receive the car axle and support the car with its wheels off the truck platform, said pillow blocks provided with a lateral flange extending into the plane of the car wheel to form a chock, the slots having inclined walls to press the wheel against the flange.

21. The combination, with a railway track, and a motor car, of a truck arranged to receive said car and provided with wheels to run on said track, means for disconnecting the motor from the car wheels, and means for connecting the motor with the truck wheels.

22. The combination, with a railway track, and a motor car, of a truck arranged to receive said car and provided with wheels to run on said track, a sprocket chain to connect the motor with the wheels of the car, and a sprocket chain to connect the motor with the wheels of the truck, said chains being arranged to be used alternatively.

23. The combination, with a railway track, and a motor car, of a truck arranged to receive said car and provided with wheels to run on said track, the axle of the truck provided with a sprocket wheel, the platform of the truck provided with a slot in line between the sprocket on the truck and the motor of the car when in position, and a sprocket chain arranged to gear the motor of the car with the sprocket of the truck by way of the slot.

24. The combination, with a railway track, and a motor car, of a truck arranged to receive said car and provided with wheels to run on said track, the axles of the truck provided each with a sprocket wheel, the platform of the truck provided with slots in line between one of the truck sprockets and the motor of the car when facing in either direction, and a sproket chain arranged to gear the motor with a truck sprocket by way of the slot.

25. The combination, with a railway track, and a motor car, of a truck arranged to receive said car and provided with wheels to run on said track, the truck provided with a downwardly depending apron surrounding the wheels and inclined to a point at both ends to serve as a wind brake, and means to gear the motor of the car to the wheels of the car truck.

26. The combination, with a railway track, and a motor car, of a truck arranged to receive said car and provided with wheels to run on said track, the truck provided with a downwardly depending apron surrounding the wheels and inclined to a point at both ends to serve as a wind brake, and means to gear the motor of the car alternatively to the wheels of the car and the truck.

27. The combination, with a railway track, and a motor car, of a truck arranged to receive said car and provided with wheels to run on said track, the truck provided with a downwardly depending apron surrounding the wheels and inclined to a point at both ends and also with upwardly extending side walls and hinged end gates to serve as a wind brake when running, the gates opening to receive or discharge the car from said truck, and means to gear the motor to the wheels of the truck.

28. The combination, with a railway track, and a motor car, of a truck arranged to receive said car and provided with wheels to run on said track, the truck provided with a downwardly depending apron surrounding the wheels and inclined to a point at both ends and also with upwardly extending side walls and hinged end gates to serve as a wind brake when running, the gates opening to receive or discharge the car from said truck, and means to gear the motor alternatively to the wheels of the car and truck.

29. The combination, with a railway track, and a motor car, of a truck arranged to receive said car and provided with wheels to run on said track, the truck provided with a downwardly depending apron surrounding the wheels and inclined to a point at both ends and also with upwardly extending side walls and hinged end gates to serve as a wind brake when running, the gates opening to receive or discharge the car from said truck, pillow blocks provided with slots to receive the car axle and support the car with its wheels free of the truck platform, said pillow blocks provided with a flange extending laterally into the plane of the car wheels to form a chock with a curved face, the slots having inclined walls to press the wheel against the curved face of the chock, guard rails secured to the truck platform and bearing laterally against the pillow blocks, chains secured to the truck and the car, turn-buckles in said chains to adjust the same, a sprocket wheel in each of the truck axles, the truck platform provided with slots one in line between one of the sprockets and the car motor when facing in either direction, means to disconnect the motor from the car wheel, and a sprocket chain arranged to gear the motor with a truck sprocket by way of the slot in line between the two.

30. The combination, with a railway track, and a motor car, of a truck arranged to receive said motor car and provided with wheels to run on said track, means to gear the motor to the wheels of the truck, a brake acting on the truck wheels, and means operable from the car to control the brake.

31. The combination, with a railway track, and a motor car, of a truck arranged to receive said motor car and provided with wheels to run on said track, means to gear the motor to the wheels of the truck, a brake acting on the truck wheels, and a detachable bar operable from the car to control the brake.

32. The combination, with a railway track, and a motor car, of a truck arranged to receive said motor car and provided with wheels to run on said track, means to gear the motor to the wheels of the truck, a brake acting on the truck wheels, a lever controlling the brake and formed as a socket, and a bar arranged to enter the socket and extending within reach of the car seat.

33. The combination, with a railway track, and a motor car, of a truck arranged to receive said motor car and provided with wheels to run on said track, means to gear the motor to the wheels of the truck, a pneumatic alarm device supplied from the truck, and means operable from the car to control said alarm device.

34. The combination, with a railway track, and a motor car, of a truck arranged to receive said car and provided with wheels to run on said track, the truck provided with a downwardly depending apron surrounding the wheels and inclined to a point at both ends and also with upwardly extending side walls and hinged end gates to serve as a wind brake when running, the gates opening to receive or discharge the car from said truck, pillow blocks provided with slots to receive the car axle and support the car with its wheels free of the truck platform, said pillow blocks provided with a flange extending laterally into the plane of the car wheels to form a chock with a curved face, the slots having inclined walls to press the wheel against the curved face of the chock, guard rails secured to the truck platform and bearing laterally against the pillow blocks, chains secured to the truck and the car, turn-buckles in said chains to adjust the same, a sprocket wheel in each of the truck axles, the truck platform provided with slots one in line between one of the sprockets and the car motor when facing in either direction, means to disconnect the motor from the car wheel, a sprocket chain arranged to gear the motor with a truck sprocket by way of the slot in line between the two, a brake acting on the car wheels, a lever controlling the brake and formed as a socket, a bar arranged to enter the socket to operate the lever, a pneumatic alarm device supplied from the truck, and means operable from the car to control said alarm device.

In testimony whereof I hereunto affix my signature in the presence of two witnesses.

SARGEANT PRENTISS KNUT.

Witnesses:
 LEWIS T. GREIST,
 EDWIN O. HILDEBRAND.